(12) United States Patent
Akiyama et al.

(10) Patent No.: US 11,260,758 B2
(45) Date of Patent: Mar. 1, 2022

(54) RAILCAR CONTROL DEVICE, TRAIN SET, AND METHOD OF CONTROLLING TRACTION MOTOR

(71) Applicant: KAWASAKI JUKOGYO KABUSHIKI KAISHA, Kobe (JP)

(72) Inventors: Satoru Akiyama, Kobe (JP); Shinichiro Iwanaga, Kawanishi (JP); Teruyuki Takahashi, Kobe (JP); Jyoji Yamada, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 616 days.

(21) Appl. No.: 16/060,976

(22) PCT Filed: Dec. 9, 2015

(86) PCT No.: PCT/JP2015/006140
§ 371 (c)(1),
(2) Date: Jun. 11, 2018

(87) PCT Pub. No.: WO2017/098239
PCT Pub. Date: Jun. 15, 2017

(65) Prior Publication Data
US 2018/0361878 A1 Dec. 20, 2018

(51) Int. Cl.
*B60L 15/38* (2006.01)
*B60L 50/16* (2019.01)
*B60L 15/20* (2006.01)
*B61C 3/00* (2006.01)

(52) U.S. Cl.
CPC ........... *B60L 15/38* (2013.01); *B60L 15/2045* (2013.01); *B60L 50/16* (2019.02); *B60L 2200/26* (2013.01);
(Continued)

(58) Field of Classification Search
CPC ...... B60L 15/38; B60L 50/16; B60L 15/2045; B60L 2240/421; B60L 2240/443;
(Continued)

(56) References Cited

U.S. PATENT DOCUMENTS

2005/0000386 A1 1/2005 Inarida
2008/0281479 A1* 11/2008 King ........................ B60L 7/18
701/22
(Continued)

FOREIGN PATENT DOCUMENTS

DE 102013207047 B3 8/2014
JP H06-335107 A 12/1994
(Continued)

*Primary Examiner* — Rami Khatib
(74) *Attorney, Agent, or Firm* — Oliff PLC

(57) ABSTRACT

A railcar control device controls a plurality of traction motors included in a train set. The railcar control device includes: a control command input portion to which a control command is input; and a torque command determining portion configured to determine torque commands with respect to a plurality of traction motors such that when a required torque based on the control command input to the control command input portion is less than a maximum value, a torque of a specific traction motor among the plurality of traction motors is made lower than a torque of a different traction motor other than the specific traction motor.

14 Claims, 10 Drawing Sheets

(52) U.S. Cl.
CPC ... *B60L 2240/421* (2013.01); *B60L 2240/423* (2013.01); *B60L 2240/441* (2013.01); *B60L 2240/443* (2013.01); *B60L 2270/142* (2013.01); *B61C 3/00* (2013.01); *Y02T 10/72* (2013.01)

(58) Field of Classification Search
CPC ......... B60L 2270/142; B60L 2240/441; B60L 2240/423; B60L 2200/26; Y02T 10/72; Y02T 10/7072; Y02T 30/00; Y02T 10/64; B61C 3/00; B61C 17/12; B61L 3/006
See application file for complete search history.

(56) References Cited

U.S. PATENT DOCUMENTS

| | | |
|---|---|---|
| 2013/0313059 A1 | 11/2013 | Inarida et al. |
| 2014/0020999 A1 | 1/2014 | Kawasaki et al. |
| 2015/0191183 A1* | 7/2015 | Daum ................ B61L 15/0081 701/19 |
| 2016/0075345 A1 | 3/2016 | Sonnleitner et al. |

FOREIGN PATENT DOCUMENTS

| | | |
|---|---|---|
| JP | H07-87612 A | 3/1995 |
| JP | H07-308004 A | 11/1995 |
| JP | 2000-134701 A | 5/2000 |
| JP | 2005-027447 A | 1/2005 |
| JP | 2014-140294 A | 7/2014 |
| JP | 2014-236547 A | 12/2014 |
| WO | 2012/095895 A1 | 7/2012 |

\* cited by examiner

COMPARATIVE EXAMPLE

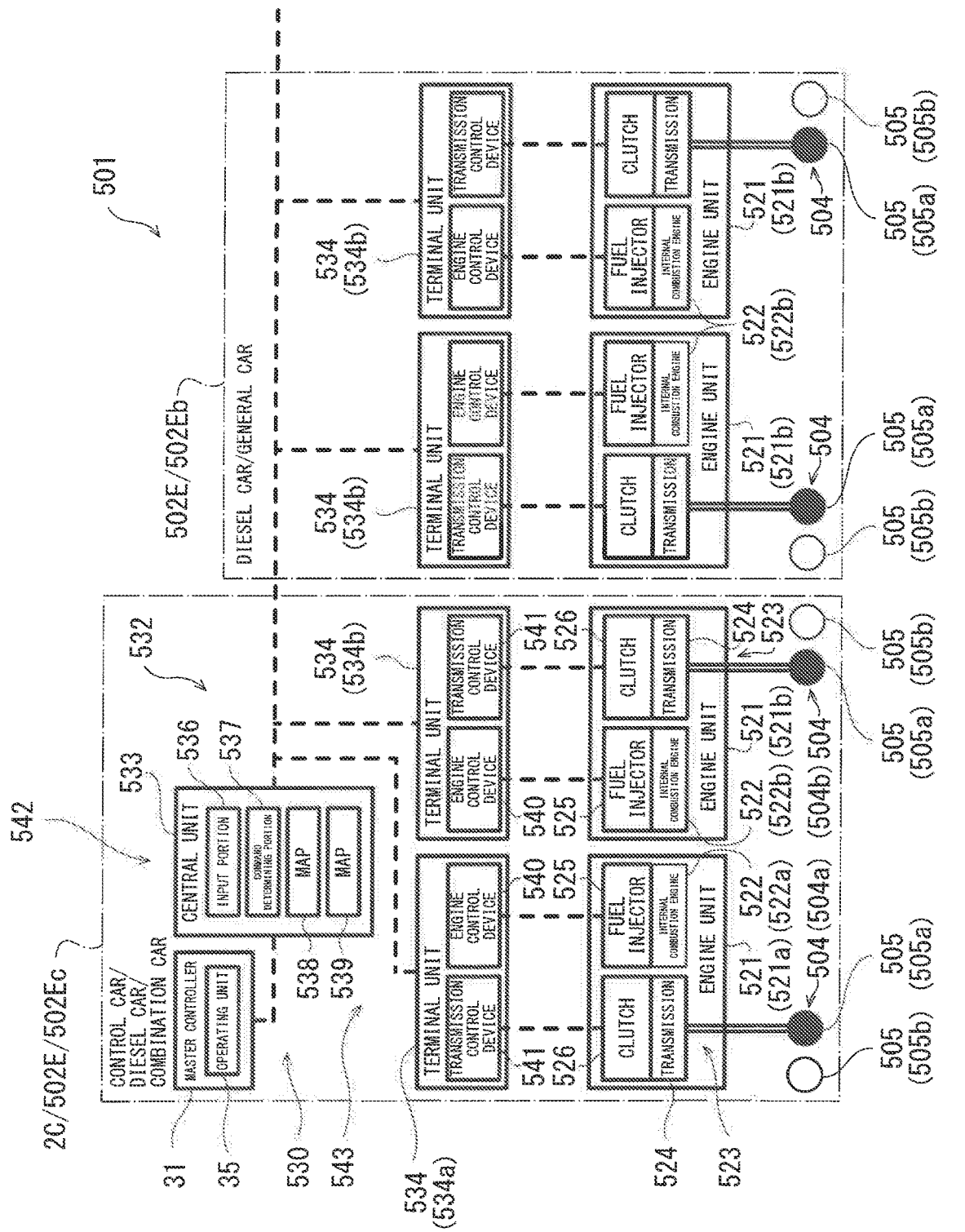

RAILCAR CONTROL DEVICE, TRAIN SET, AND METHOD OF CONTROLLING TRACTION MOTOR

TECHNICAL FIELD

The present invention relates to a control device for a railcar, a train set including the control device, and a method of controlling a traction motor or internal combustion engine of the railcar.

BACKGROUND ART

A railcar includes a plurality of specific noise sources, such as an underfloor apparatus, a traction motor mounted on a bogie, and a gear and gear shaft coupling configured to transmit power between the traction motor and a wheelset. Further, in a diesel car, an internal combustion engine is also the noise source. Noises from these noise sources are combined to become internal and external noises of a railcar. Various technologies for reducing internal and external noises of railcars have been proposed.

PTL 1 discloses a car control device configured to refer to a prestored pattern to determine the number of operating inverters in accordance with a load of a train set.

PTL 2 discloses a control device configured to cause a traction motor to output a powering torque or a regenerative torque during coasting for the purpose of reducing a gap between tooth surfaces of a gear shaft coupling.

CITATION LIST

Patent Literature

PTL 1: Japanese Laid-Open Patent Application Publication No. 6-335107
PTL 2: Japanese Laid-Open Patent Application Publication No. 7-87612

SUMMARY OF INVENTION

Technical Problem

A train set may be made up of a plurality of cars of different grades. A high-grade car is designed so as to be able to provide much comfort to passengers. Therefore, it is desirable that even in the same train set, the high-grade car can provide a quieter environment. A power source is one of noise sources in a railcar. Therefore, in some cases, the quietness of the high-grade car is further improved by configuring the high-grade car as a trailer. However, to satisfy a demand of an increase in speed of the railcar, a ratio of power cars in the train set is increasing. Therefore, all of the high-grade cars may not be configured as the trailers. When the high-grade car is configured as the power car, it is difficult to provide an especially quiet environment in this high-grade car.

In some cases, a certain apparatus is mounted only on a specific car in a train set and becomes one of the noise sources. One example of such noise source is a power collector (such as a pantograph). There is a possibility that the internal noises of the car on which the apparatus as the noise source is mounted are larger than the internal noises of a car on which the apparatus is not mounted.

As above, in some cases, an internal environment of a specific car in a train set is required to have higher quietness, but the internal noises of the specific car are larger. However, PTLs 1 and 2 do not have any measures against such situation.

An object of the present invention is to reduce noises of a specific car in a train set.

Solution to Problem

A railcar control device according to one aspect of the present invention is a railcar control device configured to control a plurality of traction motors included in a train set, the railcar control device including: a control command input portion to which a control command is input; and a torque command determining portion configured to determine torque commands with respect to the plurality of traction motors such that when a required torque based on the control command input to the control command input portion is less than a maximum value, a torque of a specific traction motor among the plurality of traction motors is made lower than a torque of a different traction motor other than the specific traction motor.

A railcar control device according to another aspect of the present invention is a railcar control device configured to control a plurality of internal combustion engines included in a train set, the railcar control device including: a control command input portion to which a control command is input; and an output command determining portion configured to determine outputs of the plurality of internal combustion engines such that when a required output of the internal combustion engines based on the input control command is less than a maximum value, an output of a specific internal combustion engine among the plurality of internal combustion engines is made lower than an output of a different internal combustion engine other than the specific internal combustion engine.

A train set according to one aspect of the present invention includes the above railcar control device.

A railcar traction motor controlling method according to one aspect of the present invention includes: inputting a control command; and outputting torque commands to the plurality of traction motors such that when a required torque based on the input control command is less than a maximum value, a torque of a specific traction motor among the plurality of traction motors is made lower than a torque of a different traction motor other than the specific traction motor.

A railcar internal combustion engine controlling method according to one aspect of the present invention includes: inputting a control command; and outputting output commands to the plurality of internal combustion engines such that when a required output of the internal combustion engines based on the input control command is less than a maximum value, an output of a specific internal combustion engine among the plurality of internal combustion engines is made lower than an output of a different internal combustion engine other than the specific internal combustion engine.

According to the above configuration, when the required torque (required output) based on the control command is less than the maximum value, the torque (output) of the specific traction motor (specific internal combustion engine) becomes lower than the different traction motor (different internal combustion engine). Therefore, noises from the specific traction motor (specific internal combustion engine) are made smaller than noises from the different traction motor (different internal combustion engine). On this account, noises around the bogie (around the specific internal combustion engine) driven by the specific traction motor (specific internal combustion engine) can be made smaller than noises in the other area in the train set.

Advantageous Effects of Invention

According to the present invention, noises of a specific car in a train set can be reduced.

BRIEF DESCRIPTION OF DRAWINGS

FIG. 9 is a conceptual diagram of engine units and the control device according to Embodiment 5.

DESCRIPTION OF EMBODIMENTS

Hereinafter, embodiments will be explained in reference to the drawings.

Embodiment 1

Train Set

Figure 1:
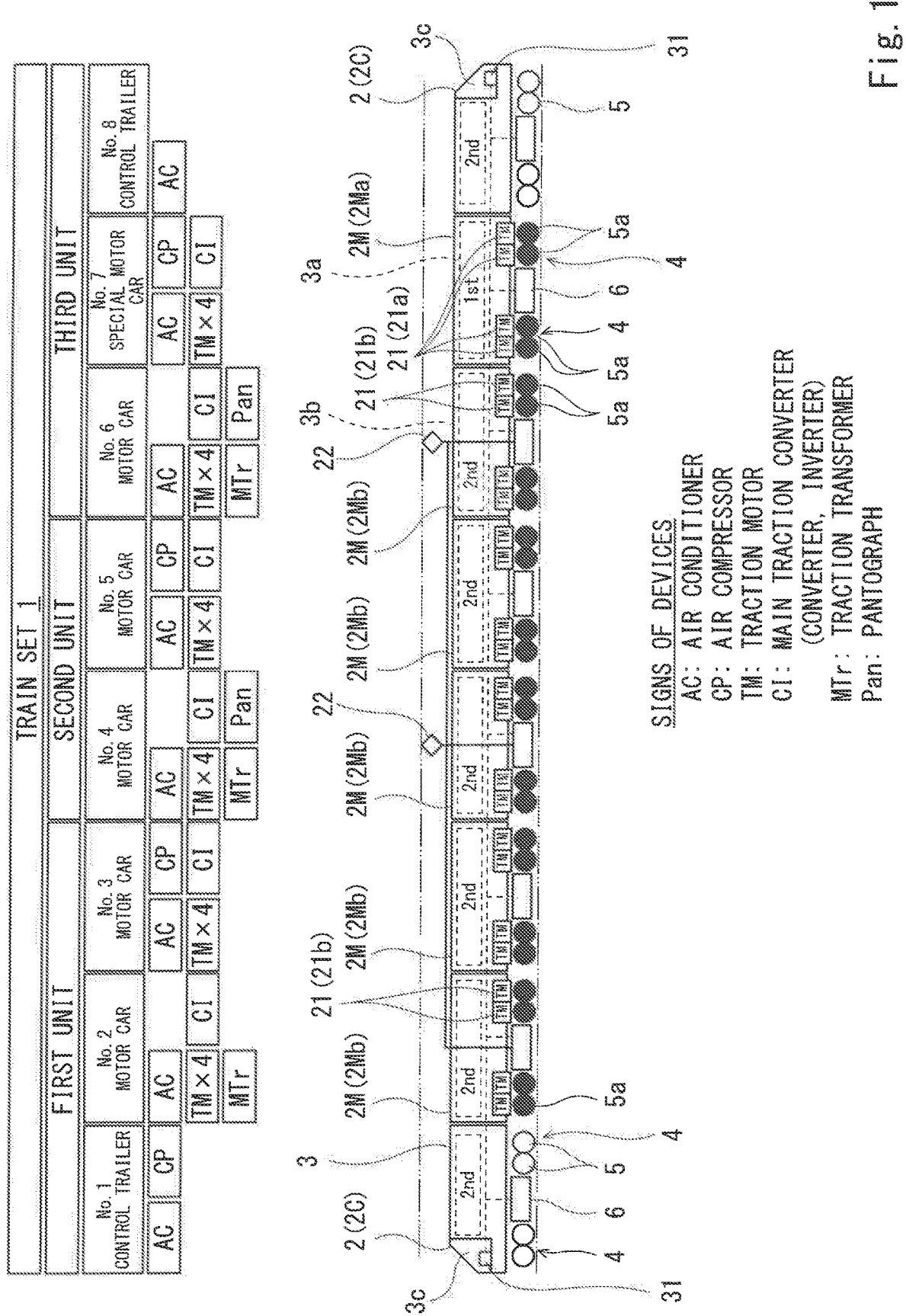
FIG. 1 is a conceptual diagram of a train set according to Embodiment 1.

FIG. 1 shows a train set 1 according to Embodiment 1. The train set 1 is made up of a plurality of cars 2. In the illustrated example, each of the cars 2 is a bogie car including a carbody 3 and two bogies 4. The two bogies 4 are arranged so as to separate from each other in a car longitudinal direction. Each of the bogies 4 includes two wheelsets 5 that roll on a rail R. The carbody 3 is supported by the two bogies 4. An underfloor apparatus 6 is provided under a floor of the carbody 3 and is arranged between the two bogies 4. It should be noted that blocks AC, CP, TM, CI, MTr, and Pan are shown at an upper part of FIG. 1 so as to correspond to the cars 2. These blocks schematically show apparatuses included in the cars 2. Among these blocks, an air conditioner AC, an air compressor CP, a traction motor TM, a main traction converter CI, and a traction transformer MTr constitute the underfloor apparatus 6. Although a pantograph Pan is provided at a roof the block of the pantograph Pan is shown together with the blocks of the underfloor apparatus 6 (the same is true in FIGS. 6 and 8). It should be noted that the air conditioner AC may be provided at the roof (see Embodiment 5 shown in FIG. 8). The train set 1 is made up by coupling by a coupler (not shown) the two cars 2 adjacent to each other in the car longitudinal direction.

In the train set 1, some or all of the cars 2 (in the illustrated example, some of the cars 2) are motor cars 2M. Each of the motor cars 2M includes one or more traction motors 21. An output shaft of each traction motor 21 is coupled to one or more wheelsets 5 through a power transmission mechanism (not shown), and the traction motor 21 rotates the corresponding one or more wheelsets 5. Hereinafter, the wheelset coupled to the traction motor 21 through the power transmission mechanism may be called a "driven wheelset 5a" (see black circles in FIG. 1).

For example, the traction motors 21 correspond one-to-one to the driven wheelsets 5a, and each traction motor 21 rotates one corresponding driven wheelset 5a. All of the four wheelsets 5 of the motor car 2M are the driven wheelsets 5a. Two traction motors 21 are provided at one bogie 4 of the motor car 2M, and four traction motors 21 are mounted on one motor car 2M. It should be noted that the number of traction motors 21 in one motor car M can be suitably changed. One bogie 4 of the motor car 2M may include one traction motor 21, and this traction motor 21 may drive two wheelsets 5 of this bogie 4.

Each of the cars 2 is a passenger car including a passenger room in the carbody 3. The passenger rooms are classified into grades, such as a "special (or first-grade) area 3a" and a "general (or second-grade) area 3b." The general area 3b is provided with general seats. To provide a more comfortable internal environment than the general area 3b, the special area 3a is provided with special seats that are higher in quality than the general seats in terms of characteristics (a size, hardness, a material of a top layer, and the like) and functions. In the present description, the "seat" denotes a facility on which a passenger places his/her body while in the railcar and may be a seat or a berth. Hereinafter, a passenger car in which the entire passenger room is the general area 3b may be referred to as a "general car," and a passenger car in which a part of the passenger room or the entire passenger room is the special area 3a may be referred to as a "special car." The special car in which the passenger room includes both the special area 3a and the general area 3b may be especially referred to as a "combination car" (see Embodiment 2).

The train set 1 includes the cars 2 of two or more grades. For example, one of the cars 2 is the special car, and the remaining cars 2 are the general cars. In the present embodiment, the entire passenger room of the special car is the special area 3a, and this special car is the motor car 2M. Hereinafter, the special car that is the motor car may be referred to as a "special motor car 2Ma," and the general car that is the motor car may be referred to as a "general motor car 2Mb."

In the present embodiment, depending on situations, each of torques of four traction motors 21 mounted on the special motor car 2Ma becomes lower than each of torques of the remaining traction motors 21. With this, the quietness in the special area 3a improves, and this improves the internal environment provided to the passengers in the special car. Hereinafter, among the traction motors 21 in the train set 1, the traction motor whose torque may be especially made low may be referred to as a "specific traction motor 21a," and the traction motor other than the specific traction motor 21a may be referred to as a "normal traction motor 21b." In the present embodiment, all of the four traction motors 21 mounted on the special motor car 2Ma are the specific traction motors 21a.

Main Circuit Devices and Control Device

Figure 2:
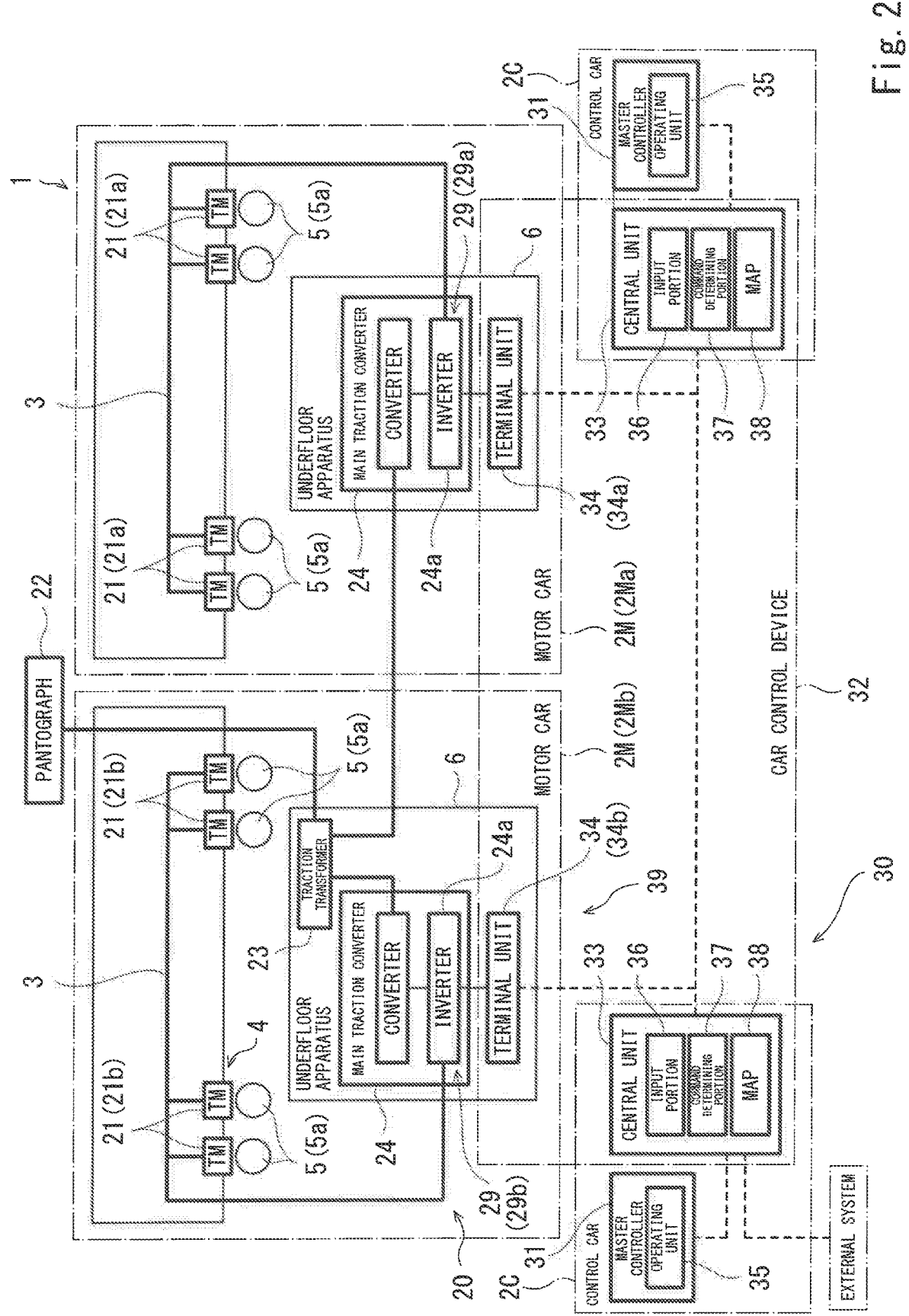
FIG. 2 is a conceptual diagram of a main circuit and a control device according to Embodiment 1.

FIG. 2 schematically shows the configurations of a main circuit 20 and control device 30 of the train set 1. The main circuit 20 is a main electric circuit configured to connect the traction motors 21 to a power supply and drive the traction motors 21. Examples of main circuit devices constituting the main circuit 20 include a power collector, a traction transformer, and a main traction converter in addition to the traction motor 21. The train set 1 includes, as the main circuit devices, a plurality of devices suitably selected from devices exemplified herein and not exemplified herein depending on specifications, such as an electric system, a type of the traction motor, and a control system of the traction motor. Examples of the main circuit devices include a main traction converter (hereinafter referred to as a "controlled device 29") controlled by a car control device. The controlled device 29 controls, operates, or adjusts power generated by the traction motor 21. For example, the train set 1 includes, as the main circuit devices, a pantograph 22 (as the power collector), a traction transformer 23, and a main traction converter 24 when: the train set 1 is an AC electric railcar traveling through a single phase AC electrification section of an overhead contact line system; the traction motor 21 is an AC electric motor; and the control system is an inverter control system. The traction transformer 23 and the main traction converter 24 constitute the underfloor apparatus 6. In this example, an inverter 24a included in the main traction converter 24 corresponds to the controlled device 29.

The train set 1 includes two or more controlled devices 29. Each of the controlled devices 29 is connected to one or more traction motors 21 at an opposite side of the power supply in the main circuit 20. The controlled devices 29 are classified into: one or more "specific controlled devices 29a" corresponding to the specific traction motors 21a; and one or more "normal controlled device 29b" corresponding to the normal traction motors 21b.

The control device 30 includes master controllers 31 and a car control device 32. The car control device 32 includes central units 33 and two or more terminal units 34. Each of the master controllers 31 includes an operating unit 35 provided in a driver's cab 3c (see FIG. 1) of a control car 2C. The operating unit 35 corresponds to one or more levers or handles provided at the driver's cab 3c, and a driver can input a control command to the operating unit 35. Examples of the control command include a powering command and a braking command, and the operating unit 35 includes a powering operation unit to which the powering command is input and a braking command unit to which the braking command is input. It should be noted that the powering operation unit may be provided separately from or integrally with the braking operation unit.

The central unit 33 is mounted on the control car 2C and includes an input portion 36 and a command determining portion 37. The control command is input from the operating unit 35 to the input portion 36. It should be noted that the control command may be wirelessly input to the input portion 36 from an external automatic train operation system. The command determining portion 37 determines torques to be commanded to the plurality of traction motors 21, based on the control command input to the input portion 36. Then, the command determining portion 37 outputs torque commands of the determined torques to the terminal unit 34.

The terminal unit 34 constitutes the underfloor apparatus 6 and corresponds one-to-one to the controlled device 29 (and corresponds to the traction motors 21 connected to the controlled device 29). The terminal unit 34 controls an operation or state of the controlled device 29 in accordance with the torque command output from the command determining portion 37 of the central unit 33, and thus, the power generated by the corresponding traction motors 21 is controlled. When the controlled device 29 is the inverter 24a as in the above example, the terminal unit 34 controls the operation of the corresponding inverter 24a, and the inverter 24a that is the controlled device 29 controls the torques and outputs of the traction motors 21 by changing applied voltages and frequencies of the traction motors 21. Thus, the traction motors 21 output the torques determined by the command determining portion 37.

The terminal units 34 are classified into one or more "specific terminal units 34a" corresponding to the specific controlled devices 29a and one or more "normal terminal units 34b" corresponding to the normal controlled devices 29b. One example is that: the special motor car 2Ma includes one specific controlled device 29a and one specific terminal unit 34a; the specific controlled device 29a is connected to the four specific traction motors 21a mounted on the special motor car 2Ma; and the specific terminal unit 34a controls the operation of the specific controlled device 29a to control the torques and outputs of the four specific traction motors 21a. In the illustrated example, one normal controlled device 29b and one normal terminal unit 34b are mounted on one general motor car 2Mb, and the normal controlled device 29b corresponds to the four normal traction motors 21b of the general motor car 2Mb. It should be noted that the normal controlled device 29b may be connected to the normal traction motor 21b mounted on the adjacent general motor car 2Mb, and one normal terminal unit 34b may collectively control the torques and outputs of eight normal traction motors 21b.

To simplify the explanation, first, the powering command that is the control command will be explained. The powering operation unit for inputting the powering command can perform a reciprocating linear movement or reciprocating turning movement within a predetermined movable range. In this movable range, a plurality of predetermined operation positions are set discretely. Hereinafter, among the operation positions of the powering operation unit, the operation position at one end of the movable range is referred to as an "off position," and the operation position at the other end of the movable range is referred to as a "maximum powering position."

When the powering operation unit is located at the off position, the powering operation unit outputs a "notch off command" as the control command (powering command). When the powering operation unit is located at the maximum powering position, the powering operation unit outputs a "full notch command" as the control command (powering command).

Based on the control command input to the input portion 36, the command determining portion 37 determines a torque (hereinafter referred to as a "required torque") required by the entire train set 1. When determining the required torque, the command determining portion 37 may refer to a load, a travelling speed, and a slope at a present location in addition to the control command. For example, when the notch off command is input, the required torque based on this command is determined as zero, and therefore, the car coasts. When the full notch command is input, the required torque based on this command may become maximum. In this case, the train set 1 maximally utilizes tractive performance to accelerate or climb a slope. As the operation position of the powering operation unit moves from the off position toward the maximum powering position, the control command (powering command) changes, and the required torque increases stepwise. The command determining portion 37 refers to a torque command map 38 and determines the torque to be commanded. Then, the command determining portion 37 outputs the torque command of the determined torque to the terminal unit 34. As described above, the terminal unit 34 controls the operation of the controlled device 29 in accordance with the torque command output from the command determining portion 37, and with this, the traction motors 21 output the determined torques.

In the above configuration, the operating unit 35 and the input portion 36 constitute a control command input portion 39 to which the control command is input. The command determining portion 37 and the terminal unit 34 constitute a torque command determining portion 40 configured to determine the torque commands with respect to the plurality of traction motors 21 in accordance with the required torque based on the input control command. The torque command map 38 defines, for example, a correlation of the torque command with the required torque and is prestored in the car control device 32 (for example, the central unit 33).

When the required torque is less than a maximum value, the torque command determining portion 40 (command determining portion 37) determines the torque commands with respect to the traction motors 21 such that the torque of the specific traction motor 21a becomes lower than the torque of the normal traction motor 21b. In the present embodiment, the torque command determining portion 40 (command determining portion 37) refers to the torque command map 38 and derives the torque command for the specific traction motor 21a and the torque command for the normal traction motor 21b in accordance with the required torque. The torque command for the specific traction motor 21a is output from the command determining portion 37 to the specific terminal unit 34a, and the torque command for the normal traction motor 21b is output from the command determining portion 37 to the normal terminal unit 34b.

Figure 3:
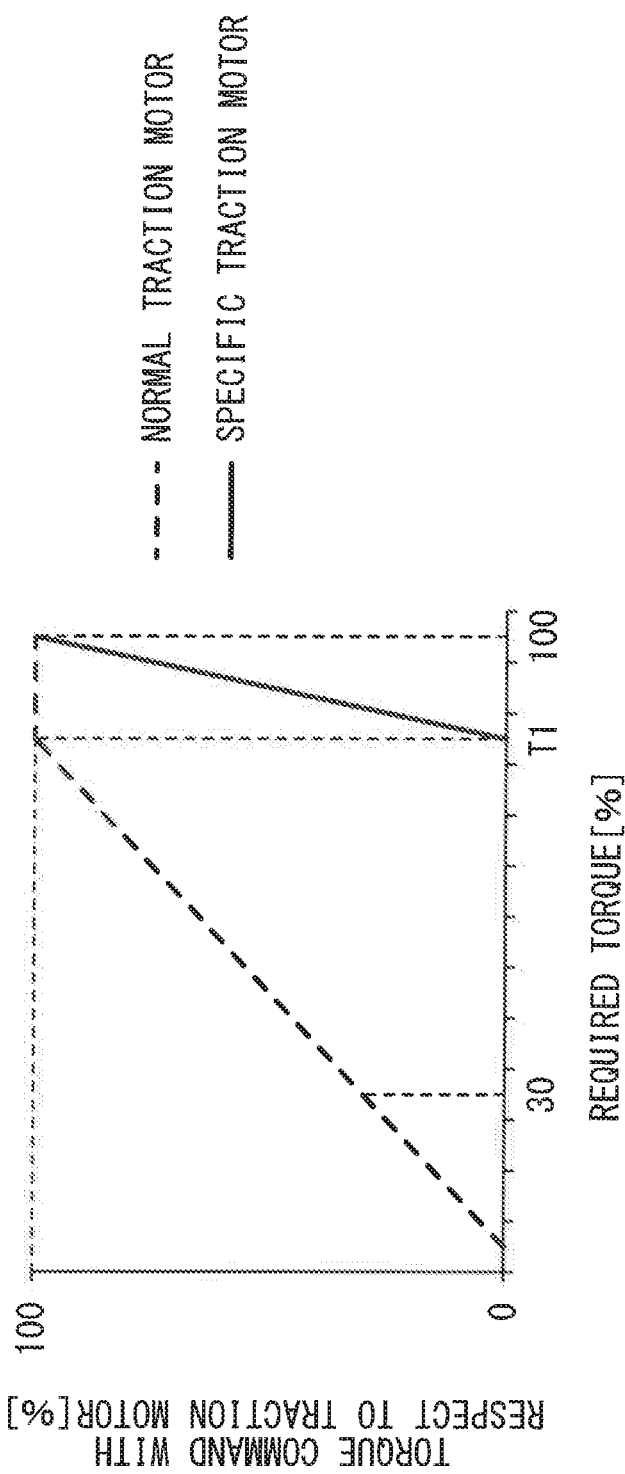
FIG. 3 is a graph showing a torque command map according to Embodiment 1.

As shown in FIG. 3, when the required torque is the maximum value (100%), each of both the torque command for the specific traction motor 21a and the torque command for the normal traction motor 21b is set to the maximum value (100%) such that the capabilities of all the traction motors 21 are maximally exerted, i.e., the tractive performance of the train set 1 is maximally exerted. When the required torque is zero (for example, when the control command is the notch off command), the torque command for the specific traction motor 21a is set to a restriction value. The restriction value is, for example, zero, and in this case, the specific traction motor 21a is not controlled to generate a torque.

As the required torque increases from zero, the torque command for the normal traction motor 21b increases. On the other hand, the torque command for the specific traction motor 21a is kept at the restriction value. When the required torque increases to reach a predetermined rising value T1 that is less than the maximum value, the torque command for the normal traction motor 21b reaches the maximum value. When the required torque further increases therefrom, the torque command for the normal traction motor 21b is kept at the maximum value, and the torque command for the specific traction motor 21a increases from the restriction value. When the required torque reaches the maximum value, the torque command for the specific traction motor 21a also reaches the maximum value. Although FIG. 3 shows that: each of the torque command for the normal traction motor 21b and the torque command for the specific traction motor 21a linearly increases or decreases; and the restriction value of the torque command for the specific traction motor 21a is zero, this is just one example. A change in the torque command with respect to a change in the required torque (i.e., a graph inclination) may be non-linear or stepwise, and the restriction value may be set to a value other than zero as described below.

Figure 4A:
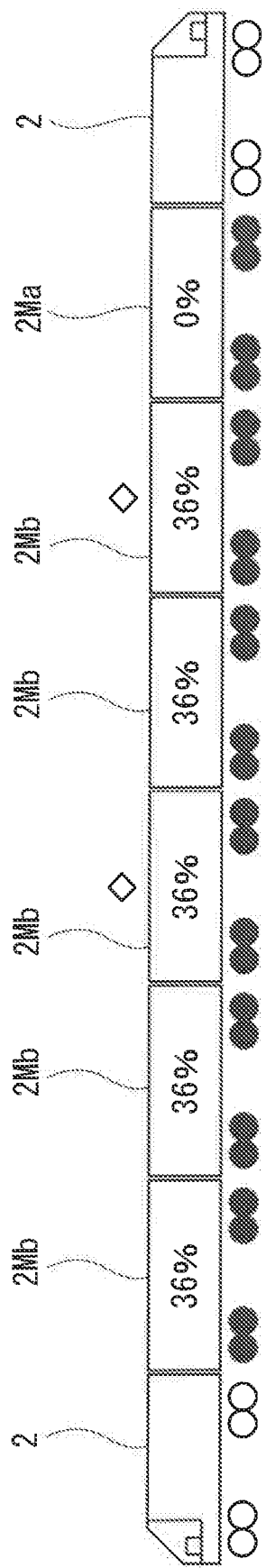
FIG. 4A shows torques of traction motors in Example.
Figure 4B:
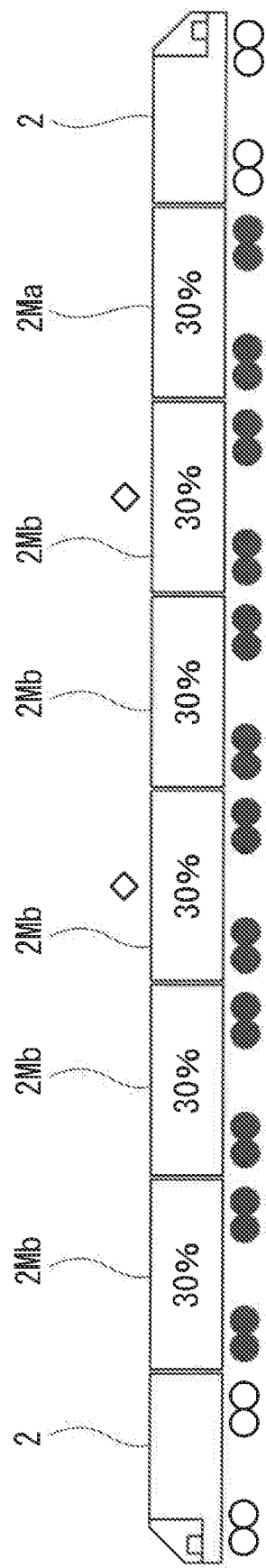
FIG. 4B shows torques of the traction motors in Comparative Example.

Each of FIGS. 4A and 4B shows torques generated by the traction motors 21 when the powering operation unit is located at an intermediate operation position between the off position and the maximum powering position, and the required torque is 30% of the maximum value. It should be noted that the rising value T1 (see FIG. 3) is larger than 30% of the maximum value of the required torque. In Comparative Example shown in FIG. 4B, the values of the torque commands for all the traction motors 21 are set to be equal to one another, and the traction motors 21 equally share the required torque. Therefore, each of the traction motors 21 generates a torque that is 30% of the maximum value of the torque that the traction motor 21 can generate. In Example shown in FIG. 4A, the torque command for the specific traction motor 21a is set to the restriction value. The normal traction controller 21b compensates for a torque that lacks since the torque command for the specific traction motor 21a is set to the restriction value. At this time, for example, the normal traction motors 21a equally share the torque to be compensated. In the illustrated example, the required torque is 30% of the maximum value, the number of normal traction motors 21b is five times the number of specific traction motors 21a, and the restriction value is zero. Therefore, the normal traction motor 21b generates a higher torque than Comparative Example by 6%. With this, the required torque is generated by the normal traction motors 21b.

In the Comparative Example shown in FIG. 4B, noise levels from the traction motors 21 are equal to one another in any of the motor cars 2M. In Example shown in FIG. 4A, when the required torque is less than the maximum value, the torque of the specific traction motor 21a is lower than the torque of the normal traction motor 21b. Therefore, when the required torque is less than the maximum value, noises around a position where the specific traction motor 21a is provided are smaller than noises around a position where the normal traction motor 21b is provided.

In the present embodiment, all of the traction motors 21 of the special motor car 2Ma are the specific traction motors 21a. Therefore, the quietness in the special car improves, and a suitable internal environment can be provided to passengers on the seats of the special car. One of reasons why the special car is configured by the motor car 2M is that a ratio of motor cars is increasing for the purpose of satisfying a demand of an increase in speed of a railcar. Therefore, according to the present embodiment, both realizing the increase in speed of the railcar and improving the internal environment of the special car can be achieved.

When the required torque is the maximum value, each of both the specific traction motors 21a and the normal traction motors 21b generates a maximum torque. With this, the tractive performance of the train set 1 is maximally exerted, so that the train set 1 can accelerate or climb a slope.

As the required torque increases, the torque command for the normal traction controller 21b increases from the restriction value, whereas the torque command for the specific traction motor 21a is kept at the restriction value. Therefore, the speed of the train set 1 can be adjusted in accordance with the control command (powering command), and noises generated from the specific traction motor 21a can be continuously suppressed. The torque command for the specific traction motor 21a is kept at the restriction value until the torque command for the normal traction controller 21b reaches the maximum value. Therefore, a control region where the noises generated from the specific traction motor 21a are continuously suppressed becomes large.

In the above Example, the restriction value is set to zero. However, the restriction value may be a value larger than zero. When the power transmission mechanism configured to transmit driving force of the specific traction motor 21a to the driven wheelset 5a includes a gear shaft coupling, and the torque of the traction motor 21 is zero, the shaft coupling may generate tooth contact sound. By setting the restriction value to such a value that a state where tooth surfaces of the gear coupling tightly contact each other by reducing a gap between the tooth surfaces can be kept, the tooth contact sound is suppressed, and internal noises around a position where the specific traction motor 21a is provided are further made small. Therefore, the restriction value may be set to, for example, a value within a range of 1% or more and 10% or less of the maximum value of the torque that the specific traction motor 21a can generate.

In the foregoing, the control command is the powering command. However, the same is true when regenerative brake is performed using the traction motor 21 in accordance with the braking command as the control command. When a regenerative braking amount required based on the braking command is from zero to a predetermined regeneration rising value, a braking torque command for the normal traction motor 21a is increased in accordance with an increase in the required regenerative braking amount for the purpose of increasing the regenerative braking amount of the normal traction motor 21b, whereas the regenerative braking amount of the specific traction motor 21a is kept at a predetermined regeneration restriction value (for example, zero). When the required regenerative braking amount is between the regeneration rising value and a maximum value, the regenerative braking amount of the specific traction motor 21a is increased in accordance with the increase in the required regenerative braking amount. With this, even during braking, when the required braking torque is less than the maximum value, the braking torque command for the specific traction motor 21a becomes smaller in value than the braking torque command for the normal traction motor 21b. Therefore, noises around a position where the specific traction motor 21a is provided become smaller than noises around a position where the normal traction motor 21b is provided.

In the foregoing, the number of special cars in the train set 1 is one. However, the train set may include a plurality of special cars. In this case, the traction motors included in each of the special cars may be the specific traction motors.

Embodiment 2

Figure 5:
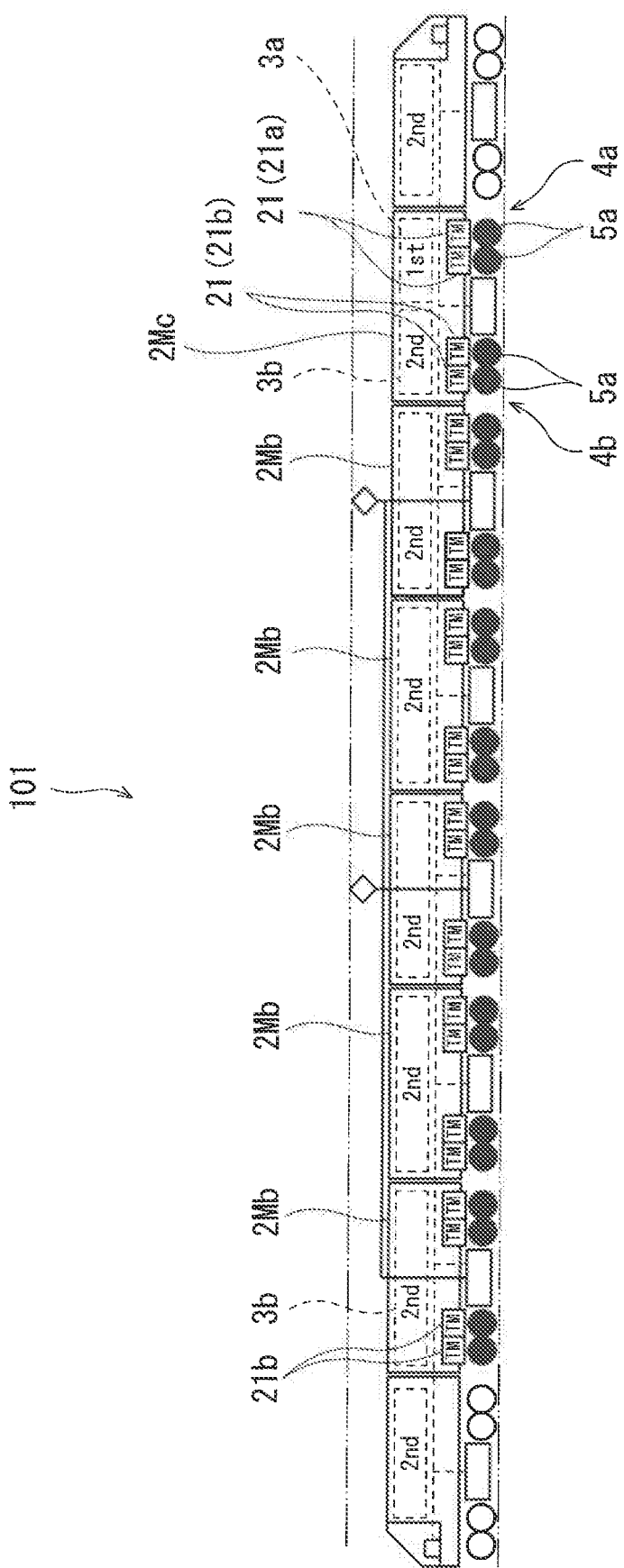
FIG. 5 is a conceptual diagram of the train set according to Embodiment 2.

As shown in FIG. 5, in a train set 101 according to Embodiment 2, the specific traction motors 21a are mounted on the combination car in which a half of the passenger room is the special area 3a, and the remaining half of the passenger room is the general area 3b. Hereinafter, the motor car that is the combination car is referred to as a "combination motor car 2Mc," and differences from Embodiment 1 will be mainly explained.

In the combination motor car 2Mc, one car longitudinal direction side of the passenger room is the special area 3a, and the other car longitudinal direction side of the passenger room is the general area 3b. The combination motor car 2Mc includes two bogies 4a and 4b spaced apart from each other in the car longitudinal direction, and each of the bogies 4a and 4b includes two driven wheelsets 5a. All of the four wheelsets are the driven wheelsets 5a, and each of the bogies 4a and 4b includes two traction motors 21. The first bogie 4a at one car longitudinal direction side is located under the special area 3a, the second bogie 4b at the other car longitudinal direction side is located under the general area 3b. The traction motors 21 provided at the first bogie 4a are the specific traction motors 21a, and the traction motors 21 provided at the second bogie 4b are the normal traction motors 21b.

With this, the quietness of the special area 3a can be particularly improved. Further, even when the required torque is less than the rising value, the combination car can generate the torque. It should be noted that a plurality of combination motor cars may be included in a train set.

Embodiment 3

Figure 6:
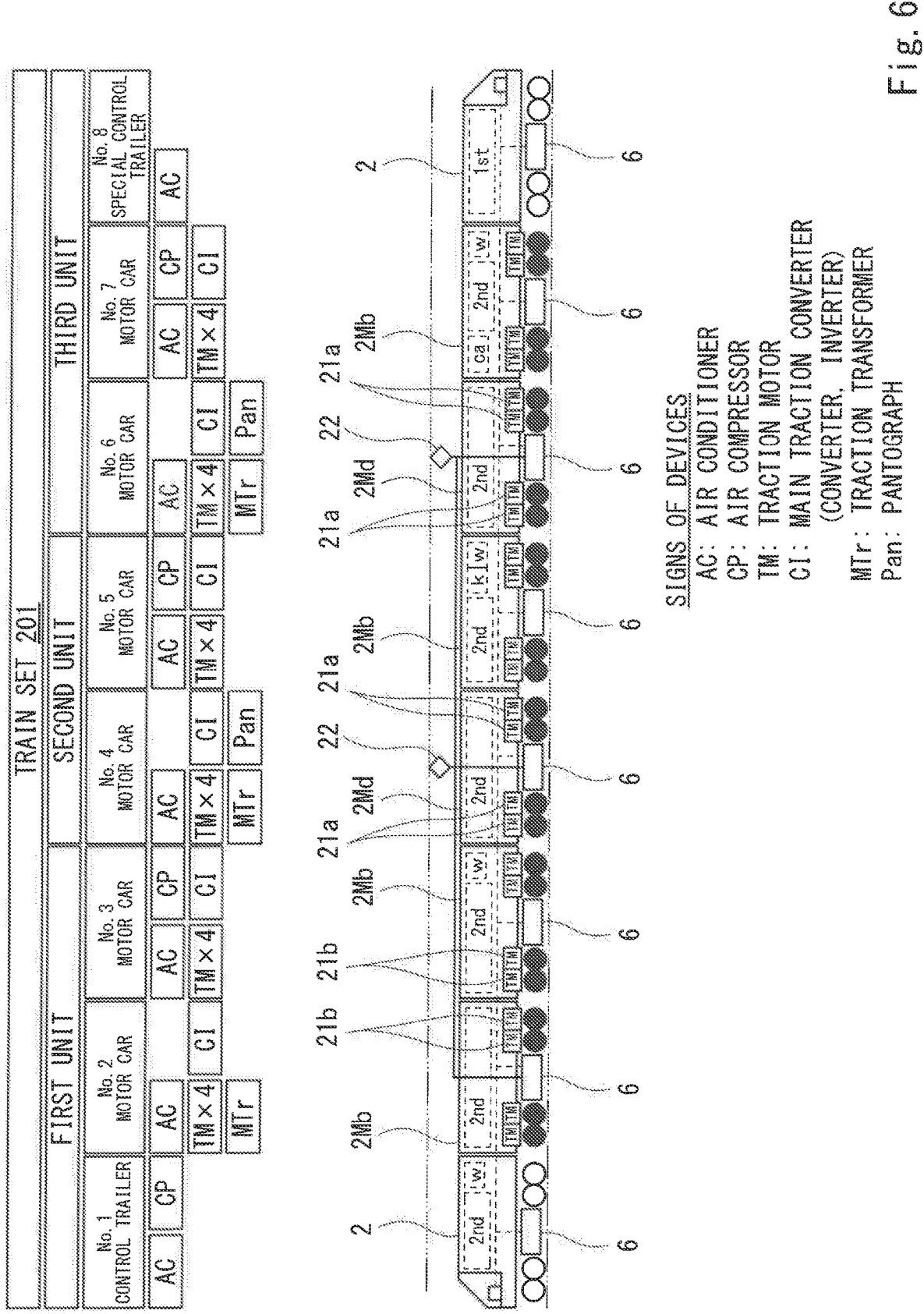
FIG. 6 is a conceptual diagram of the train set according to Embodiment 3.

As shown in FIG. 6, in a train set 201 according to Embodiment 3, all of the motor cars 2M are the general cars, and the grades of the passenger rooms of the motor cars 2M are the same as one another. However, the noise sources of the railcar are not limited to the traction motors 21, and noises are also generated from the air compressor CP, the pantograph 22, the traction transformer 23 (see FIG. 2), and the main traction converter 24 (see FIG. 2). Not all of the cars include such noise generating device. Therefore, noises of a specific car including the noise generating device become larger than noises of a car not including the noise generating device.

In the illustrated example, two motor cars 2M are specific cars 2Md each including the pantograph 22, and the other motor cars 2M do not include a pantograph. Therefore, the specific traction motors 21a are used as the traction motors 21 of the specific car 2Md, and the normal traction motors 21b are used as the traction motors 21 of the motor car 2M not including the pantograph 22.

With this, noises from the traction motors 21 in the specific car 2Md on which the noise sources are concentrated can be suppressed, and therefore, noises from the specific car 2Md can be prevented from becoming excessive. The specific car 2Md is only required to be a motor car including at least one of the air compressor CP and the main traction converter 24 (see FIG. 2) instead of or in addition to the pantograph 22.

In some cases, a room or space independent from the passenger room is formed at a car longitudinal direction end portion of the car. Examples of such room or space include a rest room w, a conductor's compartment ca, and an in-train sales preparing room k. When such space is provided in a car including the noise generating devices, such as the pantograph 22 and the traction transformer 23 (see FIG. 2), the normal traction motors 21b may be used as the traction motors 21 of the bogie 4 arranged under such space, and the specific traction motors 21a may be used as the traction motors 21 of the remaining bogie 4, and with this, control may be executed.

Embodiment 4

Figure 7:
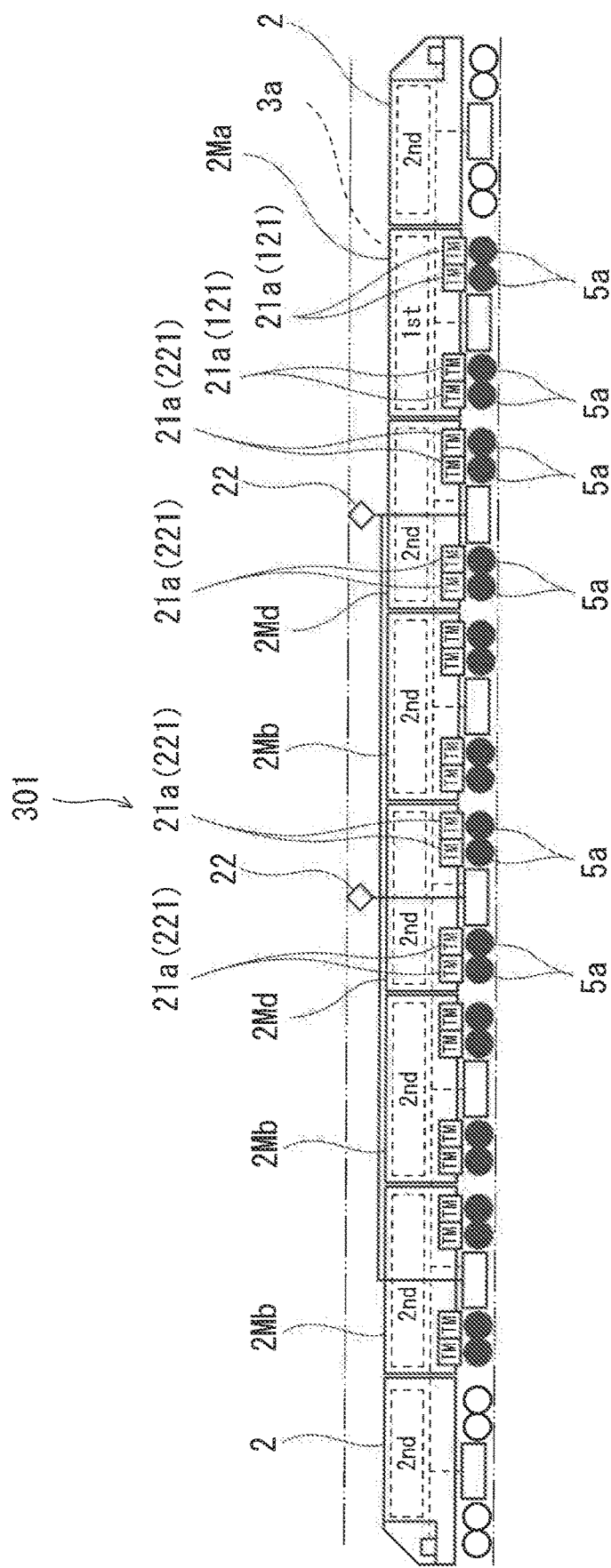
FIG. 7 is a conceptual diagram of the train set according to Embodiment 4.

As shown in FIG. 7, in Embodiment 4, a train set 301 includes one special motor car 2Ma and the general motor cars including the specific cars 2Md each including the pantograph 22 as the noise source other than the traction motors 21. In such a case, the traction motors 21 mounted on the special motor car 2Ma and the traction motors 21 mounted on the specific cars 2Md may be the specific traction motors 21a. In this case, the same torque commands may be given to the specific traction motors 21a.

The specific traction motors 21a may be classified into first specific traction motors 121 and second specific traction motors 221. As the required torque increases after the torque command for the normal traction motor 21b reaches the maximum value, the torque command for the second specific traction motor 221 may be increased from the restriction value, whereas the torque command for the first specific traction motor 121 may be kept at the restriction value. As the required torque increases after the torque command for the second specific traction motor 221 reaches the maximum value, the torque command for the first specific traction motor 121 may be increased from the restriction value. In the illustrated example, the traction motors 21 of the special motor car 2Ma are the first specific traction motors 121. However, the traction motors 21 of the specific cars 2Md may be the first specific traction motors 121.

Embodiment 5

Figure 8:
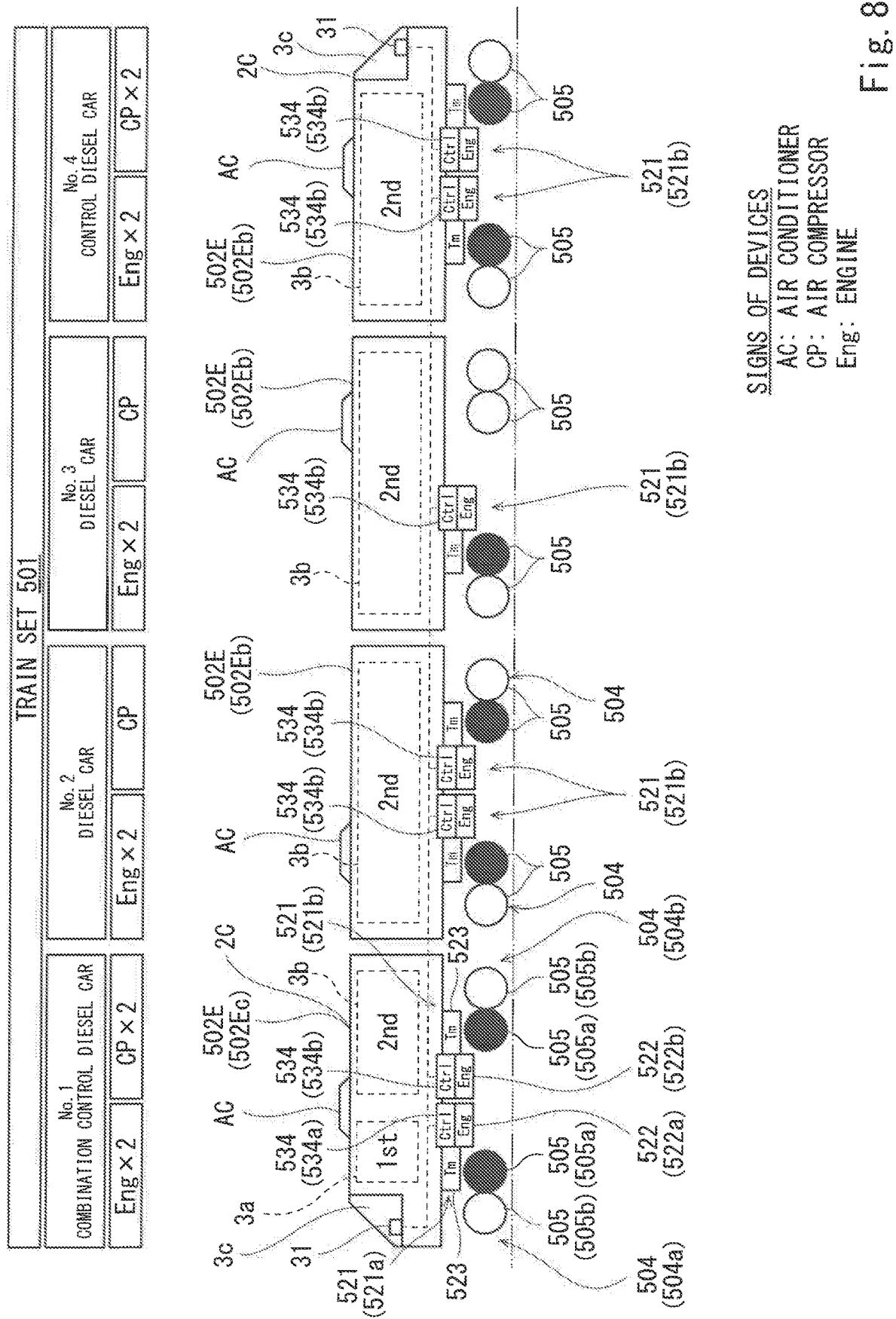
FIG. 8 is a conceptual diagram of the train set according to Embodiment 5.

As shown in FIG. 8, in a train set 501 of Embodiment 5, some or all of cars 502 are diesel cars 502E. In the illustrated example, all of four cars making up the train set 501 are the diesel cars 502E. Further, one of the four cars is the combination car, and the remaining three cars are the general cars. Hereinafter, the combination car that is the diesel car is referred to as a "combination diesel car 502Ec," and the general car that is the diesel car is referred to as a "general diesel car 502Eb." In the combination diesel car 502Ec, one car longitudinal direction side of the passenger room is the special area 3a, and the other car longitudinal direction side of the passenger room is the general area 3b. The combination diesel car 502Ec includes: a first bogie 504a arranged at one car longitudinal direction side and located under the special area 3a; and a second bogie 504b arranged at the other car longitudinal direction side and located under the general area 3b.

Each of the diesel cars 502E includes, as a part of the underfloor apparatus, an engine unit(s) 521 configured to rotate a wheelset 505. Hereinafter, a bogie driven by the engine unit 521 is referred to as a "power bogie." Among the wheelsets 505, the wheelset to which power is transmitted from the engine unit 521 is referred to as a "driven wheelset 505a" (see black circles in FIG. 8), and the wheelset to which power is not transmitted from the engine unit 521 is referred to as a "trailing wheelset 505b" (see white circles in FIG. 8).

The engine unit 521 includes an internal combustion engine 522 and a power transmission device 523. The diesel car 502E is a diesel hydraulic car. To be specific, the internal combustion engine 522 is a diesel engine, and the power transmission device 523 includes a transmission 524 having a fluid torque converter (not shown).

An output of the internal combustion engine 522 is controlled by a fuel injection quantity of a fuel injector 525 included in the internal combustion engine 522. An output shaft of the internal combustion engine 522 is connected to an input shaft of the transmission 524, and power generated by the internal combustion engine 522 is input to the transmission 524. The transmission 524 changes rotational power at a speed ratio corresponding to a speed stage and transmits the power to an output shaft of the transmission 524. The speed stages of the transmission 524 include a "hydraulic stage," a "direct drive stage," and a "neutral stage." The transmission 525 includes a clutch 526 configured to switch the speed stages. The speed stages can be switched by operating the clutch. To simplify the explanation, each of both the number of hydraulic stages and the number of direct drive stages is one. However, each of the number of hydraulic stages and the number of direct drive stages may be plural.

Generally, the hydraulic stage is a low speed stage (first gear) utilized in a low car speed range, and the direct drive stage is a high speed stage (second gear) utilized in a high car speed range. When the hydraulic stage is selected, the input power is transmitted through the fluid torque converter to the output shaft of the transmission 524. When the direct drive stage is selected, the input power is mechanically transmitted to the output shaft of the transmission 524 without through the fluid torque converter. When the neutral stage is selected, the internal combustion engine 522 is separated from the driven wheelset 505a, i.e., becomes a no-load state, and therefore, power is not transmitted between the input and output shafts of the transmission 525.

In the present embodiment, the engine units 521 correspond one-to-one to power bogies 504, and each of the engine units 521 rotates one of two wheelsets included in the power bogie 504. The output shaft of the transmission 525 is connected to one wheelset of the power bogie 504 through a power transmission mechanism, such as a propeller shaft or a final reducer.

As with Embodiments 1 and 2, the output (i.e., the revolution speed) of the internal combustion engine 522 of the engine unit 521 corresponding to the first bogie 504a is lower than the output (i.e., the revolution speed) of each of the remaining internal combustion engines 522. Therefore, the quietness in the special area 3a improves.

Hereinafter, among the internal combustion engines 522 of the train set 501, the internal combustion engine whose output (i.e., revolution speed) is made especially low in some cases is referred to as a "specific internal combustion engine 522a," and the internal combustion engine other than the specific internal combustion engine 522a is referred to as a "normal internal combustion engine 522b." Further, the engine unit 521 including the specific internal combustion engine 522a is referred to as a "specific engine unit 521a," and the engine unit 521 including the normal internal combustion engine 522b is referred to as a "normal engine unit 521b."

In the present embodiment, the internal combustion engine 522 corresponding to the first bogie 504a of the combination diesel car 502Ec is the specific internal combustion engine 522a, and the internal combustion engine 522 corresponding to the second bogie 504b of the combination diesel car 502Ec and the internal combustion engines 522 included in the general diesel cars 502Eb are the normal internal combustion engines 522b.

FIG. 9 conceptually shows the configurations of the engine units 521 and a control device 530 in the train set 501. As shown in FIG. 9, as with Embodiment 1, the control device 530 includes the master controller 31. The control device 530 includes a car control device 532. The car control device 532 includes: a central unit 533 mounted on the control car 2C; and two or more terminal units 534 corresponding one-to-one to the engine units 521 and constituting the underfloor apparatus. The terminal units 534 are classified into a "specific terminal unit 534a" corresponding to the specific engine unit 521a and a "normal terminal unit 534b" corresponding to the normal engine unit 521b.

The central unit 533 includes: an input portion 536 to which the control command is input from the master controller 31; and a command determining portion 537 configured to determine output commands with respect to the internal combustion engines 522 based on the control command input to the input portion 536.

Based on the input control command, the command determining portion 537 determines an output (hereinafter referred to as a "required output") required by the entire train set 1. When determining the required output, the command determining portion 537 may refer to a load, a travelling speed, a slope at a present location in addition to the control command. As the operation position of the powering operation unit of the master controller 31 moves from the off position toward the maximum powering position, the control command changes, and the required output increases stepwise. The command determining portion 537 refers to an output command map 538 and determines the output (in other words, fuel injection quantity or fuel injection pressure) to be commanded. Then, the command determining portion 537 outputs the determined output command to the terminal units 534. Further, the command determining portion 537 refers to a speed stage command map 539 and determines the speed stage (in other words, a state of the clutch) to be commanded in accordance with the car speed. Then, the command determining portion 537 outputs the determined speed stage to the terminal units 534. The maps 538 and 539 are prestored in the car control device 532 (especially, the central unit 533).

Each of the terminal units 534 includes an engine control device 540 and a transmission control device 541. The engine control device 540 controls an output of the internal combustion engine 522 by operating the fuel injector 525 in accordance with the output command from the central unit 533. The transmission control device 541 automatically switches the speed stage, established in the transmission 524, by operating the clutch 526 in accordance with the speed stage command from the central unit 533.

In the above configuration, the operating unit 35 and the input portion 536 constitute a control command input portion 542 to which the control command is input. Further, the command determining portion 537 and the terminal units 534 (especially, the engine control devices 540) constitute an output command determining portion 543 configured to determine the output commands with respect to the plurality of internal combustion engines 522 in accordance with the required output based on the input control command.

Figure 10A:
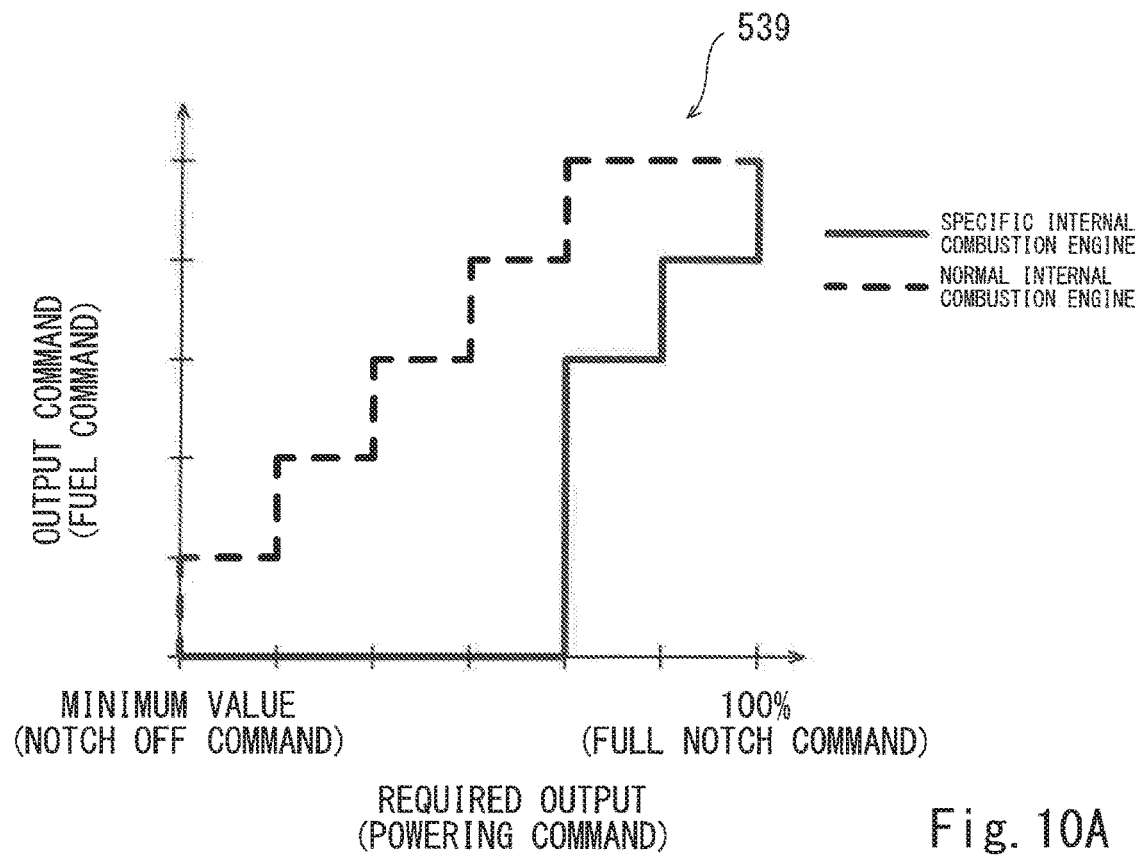
FIG. 10A is a graph showing an output command map according to Embodiment 5.

FIG. 10A shows the output command map 538. As shown in FIG. 10A, when the required output is the maximum value (100%) (for example, when the input control command is the full notch command), each of both the specific internal combustion engine 522a and the normal internal combustion engine 522b is controlled so as to output the maximum value of the output that the engine (522a, 522b) can generate. When the required output is a minimum value (for example, when the input control command is the notch off command), each of both the specific internal combustion engine 522a and the normal internal combustion engine 522b is controlled so as to perform an idling operation. When the input powering command is the notch off command, and the braking command is not input, the speed stage command becomes a command by which the neutral stage is established, and the clutch 526 is disengaged. With this, the train set 501 coasts.

As the required output increases from the minimum value (for example, as the operation position of the powering operation unit moves from the off position toward the maximum powering position), the output command for the normal internal combustion engine 522b increases. On the other hand, the output command for the specific internal combustion engine 522a is continuously restricted to the minimum value (the minimum value is the restriction value). When the required output reaches a predetermined rising value, the output command for the normal internal combustion engine 522b corresponds to the maximum value of the output that the normal internal combustion engine 522b can generate. The rising value is a value less than the maximum value (100%), and the output command for the specific internal combustion engine 522a is kept at a value smaller than the maximum value. When the required output increases therefrom, the output command for the normal internal combustion engine 522b is kept at the maximum value. When the required output increases therefrom, the output command for the normal internal combustion engine 522b is kept at the maximum value, whereas the output command for the specific internal combustion engine 522a increases. Thus, the total output generated by the train set increases. When the required output reaches the maximum value, the output command for the specific internal combustion engine 522a reaches the maximum value (100%).

Figure 10B:
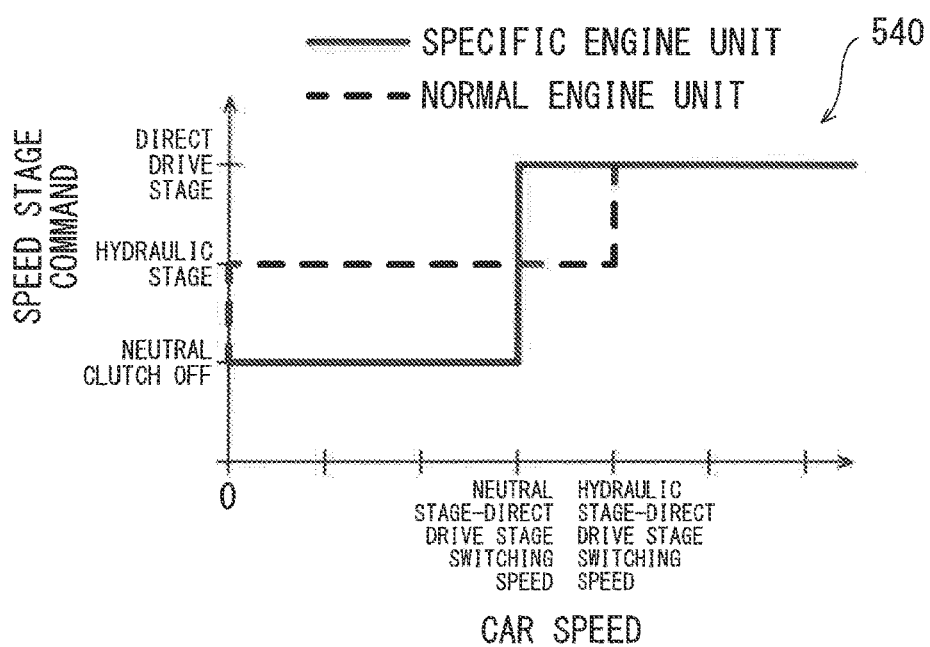
FIG. 10B is a graph showing a speed stage command map according to Embodiment 5.

FIG. 10B shows the speed stage command map 539. As shown in FIG. 10B, when the car speed is zero, each of both the speed stage command for the specific engine unit 521a and the speed stage command for the normal engine unit 521b becomes a command by which the neutral stage is established. In a section from when the car speed starts increasing until when the car speed reaches a predetermined hydraulic stage-direct drive stage switching speed, the speed stage command for the normal engine unit 521b is a command by which the hydraulic stage is established. When the car speed exceeds the hydraulic stage-direct drive stage switching speed, the speed stage command for the normal engine unit 521b becomes a command by which the direct drive stage is established. In a section from when the car speed is zero until when the car speed reaches a predetermined neutral stage-direct drive stage switching speed, the speed stage command for the specific engine unit 521a is kept as a command by which the neutral stage is established. When the car speed exceeds the neutral stage-direct drive stage switching speed, the speed stage command for the specific engine unit 521a becomes a command by which the direct drive stage is established. As above, a switching point of the speed stages regarding the speed is different between the normal engine unit and the specific engine unit, and the specific engine unit does not utilize the hydraulic stage. The neutral stage-direct drive stage switching speed is set to be lower than the hydraulic stage-direct drive stage switching speed.

A case where the commands are determined by referring to the maps 538 and 539 and control is then executed will be explained based on the elapse of time from the departure of the railcar. First, when the railcar is in a stop state, the powering operation unit is located at the off position, so that in all of the engine units 521, the clutches 526 are disengaged, and the neutral stages are established. Further, since the required output is the minimum value, all of the internal combustion engines 522 perform the idling operation. Thus, each of the revolution speeds of the internal combustion engines becomes a lowest level in a use range, and therefore, all of the areas in the railcar are quiet. When the powering operation unit is operated from the off position toward the maximum powering position, the output and revolution speed of the normal internal combustion engine 522b gradually increase, and the speed stage is switched from the neutral stage to the hydraulic stage. The torque amplified by the fluid torque converter is transmitted to the driven wheelset 505a corresponding to the normal engine unit 521b, and the car speed increases. At the time of this departure, in the specific engine unit 521a, the specific internal combustion engine continues the idling operation and is in a no-load state. Therefore, the quietness in the specific area 3a is kept so as to be equal to the quietness when the railcar is in a stop state. In a powering process, the speed reaches the neutral stage-direct drive stage switching speed before reaching the hydraulic stage-direct drive stage switching speed. When the speed reaches the neutral stage-direct drive stage switching speed, the speed stage in the specific engine unit becomes the direct drive stage. On the other hand, when the powering operation unit is located at the predetermined intermediate position, the output of the normal internal combustion engine 522b reaches the maximum value, and the specific internal combustion engine 522 stops performing the idling operation and generates the output less than the maximum value. This output is transmitted to the driven wheelset 505a of the first bogie 504a through the power transmission device 523 in which the direct drive stage is being selected.

As above, the technique of reducing the noises of the specific car in the train set adopting a distributed traction system is applicable to not only the electric motor cars described in Embodiments 1 to 4 but also the diesel cars. In the present embodiment, the noises in the specific car (especially, the specific area 3a of the combination diesel car 502Ec) can be reduced as with Embodiments 1 to 4.

It should be noted that in the above example, the transmission of the power through the fluid torque converter is not performed in the specific engine unit 521a. Therefore, the fluid torque converter may be omitted from the specific engine unit 521a. If the fluid torque converter is not omitted, for example, the hydraulic stage may be gone through in a short period of time when switching from the neutral stage to the direct drive stage.

The engine unit (the power transmission device and the transmission) included in the diesel car is not limited to a hydraulic type and may be a mechanical type or an electric type. Further, the engine included in the diesel car is not limited to the diesel engine.

The above example has explained a case where the combination diesel car is included, i.e., a case corresponding to Embodiment 2 among Embodiments 1 to 4. However, a case corresponding to Embodiment 1 or 3 can be realized by the diesel car. Control may be executed by using the specific internal combustion engine as the internal combustion engine of the special car in which the entire passenger room is the special area. Further, control may be executed by using the specific internal combustion engine as the internal combustion engine of the diesel car including the noise generating device.

Other Embodiments

The foregoing has explained the embodiments. However, the above configurations are just examples, and modifications, eliminations, and additions may be suitably made. The above embodiments may be combined arbitrarily. For example, some of components or methods in one embodiment may be applied to another embodiment. Further, some of components in an embodiment may be separated and arbitrarily extracted from the other components in the embodiment.

REFERENCE SIGNS LIST 1, 101, 201, 301, 501 train set
2, 502 car
2M motor car
2Ma special motor car
2Mc combination motor car
2Md specific car
502E diesel car
502Eb combination diesel car
3 carbody
3a special area (first-grade area)
3b general area (second-grade area)
4, 504 bogie
4a, 504a first bogie of combination car
4b, 504b second bogie of combination car
21 traction motor
21a specific traction motor
21b normal traction motor (different traction motor)
22 pantograph
23 traction transformer
24 main traction converter
522 internal combustion engine
522a specific internal combustion engine
522b normal internal combustion engine
30, 530 control device
31 master controller
32, 532 car control device
39, 541 control command input portion
40 torque command determining portion
542 output command determining portion
CP air compressor

The invention claimed is:

1. A railcar control device configured to control a plurality of traction motors included in a train set, the railcar control device comprising a processor programmed to include:
 a control command input portion to which a control command is input; and
 a torque command determining portion configured to:
  determine torque commands with respect to the plurality of traction motors such that when a required torque based on the input control command is less than a maximum value, a torque of a specific traction motor among the plurality of traction motors is set to a value greater than zero and lower than a torque of a different traction motor other than the specific traction motor of the plurality of traction motors, and
  as the required torque increases within a range less than the maximum value, control the torque command for the specific traction motor of the plurality of traction motors at a restriction value that is a value larger than zero and the set torque of the specific traction motor, and less than the maximum value.

2. The railcar control device according to claim 1, wherein:
 the input control command is a powering command; and
 when the required torque based on the powering command is the maximum value, the torque command determining portion determines the torque commands with respect to the plurality of traction motors such that all of the torques of the plurality of traction motors including the specific traction motor become equal to each other.

3. The railcar control device according to claim 1, wherein:
 the input control command is a powering command; and
 as the required torque based on the powering command increases within the range less than the maximum value, the torque command determining portion increases the torque of the different traction motor to a maximum value and controls the torque of the specific traction motor at a predetermined restriction value.

4. The railcar control device according to claim 3, wherein as the required torque based on the powering command increases after the torque of the different traction motor reaches the maximum value, the torque command determining portion increases the torque of the specific traction motor from the restriction value to a maximum value.

5. The railcar control device according to claim 1, wherein:
the input control command is a braking command; and
the torque command determining portion outputs braking torque commands, by which regenerative brake is performed, to the plurality of traction motors.

6. The railcar control device according to claim 1, wherein:
the train set includes at least one specific car; and
the specific traction motor drives the specific car.

7. The railcar control device according to claim 1, wherein:
the train set includes a plurality of motor cars;
at least one specific car among the plurality of motor cars includes a noise generating device; and
the specific traction motor drives the at least one specific car.

8. The railcar control device according to claim 7, wherein the noise generating device includes at least one of an air compressor, a main traction converter, a main controller, and a pantograph.

9. A train set comprising the railcar control device according to claim 1.

10. A railcar control device configured to control a plurality of traction motors included in a train set, the railcar control device comprising a processor programmed to include:
a control command input portion to which a control command is input; and
a torque command determining portion configured to determine torque commands with respect to the plurality of traction motors such that when a required torque based on the input control command is less than a maximum value, a torque of a specific traction motor among the plurality of traction motors is made lower than a torque of a different traction motor other than the specific traction motor of the plurality of traction motors, wherein:
the train set includes at least one combination car including the plurality of traction motors;
the at least one combination car includes:
a first bogie arranged at one side in a car longitudinal direction and including at least one traction motor of the plurality of traction motors,
a second bogie arranged at another side in the car longitudinal direction and including at least one traction motor of the plurality of traction motors,
a first-grade area formed in the at least one combination car at the one side in the car longitudinal direction, and
a second-grade area formed in the at least one combination car at the other side in the car longitudinal direction;
the traction motor of the first bogie is the specific traction motor; and
the traction motor of the second bogie is the different traction motor.

11. A railcar control device configured to control a plurality of internal combustion engines included in a train set, the railcar control device comprising a processor programmed to include:
a control command input portion to which a control command is input; and
an output command determining portion configured to:
determine outputs of the plurality of internal combustion engines such that when a required output of the plurality of internal combustion engines based on the input control command is less than a maximum value, an output of a specific internal combustion engine among the plurality of internal combustion engines is set to a value greater than zero and lower than an output of a different internal combustion engine other than the specific internal combustion engine, and
as the required output increases within a range less than the maximum value, control the output for the specific internal combustion engine at a restriction value that is a value larger than zero and the set output of the internal combustion engine, and less than the maximum value.

12. The railcar control device according to claim 11, wherein:
the output command determining portion determines fuel injection quantities of the plurality of internal combustion engines such that when the required output of the internal combustion engines based on the input control command is less than the maximum value, and
the output of the specific internal combustion engine among the plurality of internal combustion engines is made lower than the output of the different internal combustion engine other than the specific internal combustion engine.

13. A railcar traction motor controlling method of controlling a plurality of traction motors included in a train set, the railcar traction motor controlling method comprising:
inputting a control command;
outputting torque commands to the plurality of traction motors such that when a required torque based on the input control command is less than a maximum value, a torque of a specific traction motor among the plurality of traction motors is set to a value greater than zero and lower than a torque of a different traction motor other than the specific traction motor of the plurality of traction motors; and
as the required torque increases within a range less than the maximum value, controlling the torque command for the specific traction motor of the plurality of traction motors at a restriction value that is a value larger than zero and the set torque of the specific traction motor, and less than the maximum value.

14. A railcar internal combustion engine controlling method of controlling a plurality of internal combustion engines included in a train set, the railcar internal combustion engine controlling method comprising:
inputting a control command;
outputting output commands to the plurality of internal combustion engines such that when a required output of the internal combustion engines based on the input control command is less than a maximum value, an output of a specific internal combustion engine among the plurality of internal combustion engines is set to a value greater than zero and lower than an output of a different internal combustion engine other than the specific internal combustion engine; and
as the required output increases within a range less than the maximum value, controlling the output for the specific internal combustion engine at a restriction value that is a value larger than zero and the set output of the specific internal combustion engine, and less than the maximum value.

* * * * *